(12) United States Patent
Lin

(10) Patent No.: US 7,025,671 B2
(45) Date of Patent: Apr. 11, 2006

(54) AERODYNAMIC SUCTION VENTILATOR

(76) Inventor: Jason JianXiong Lin, 322 Stromer Dr., Cary, NC (US) 27513-2753

( * ) Notice: Subject to any disclaimer, the term of this patent is extended or adjusted under 35 U.S.C. 154(b) by 0 days.

(21) Appl. No.: 10/927,718

(22) Filed: Aug. 27, 2004

(65) Prior Publication Data

US 2005/0054281 A1    Mar. 10, 2005

Related U.S. Application Data

(60) Provisional application No. 60/500,957, filed on Sep. 8, 2003.

(51) Int. Cl.
*F23L 17/02* (2006.01)
(52) U.S. Cl. .................. 454/39; 454/116; 454/163
(58) Field of Classification Search .................. 454/39, 454/40, 116, 163
See application file for complete search history.

(56) References Cited

U.S. PATENT DOCUMENTS

| | | | | |
|---|---|---|---|---|
| 211,872 | A | * | 2/1879 | Noorden ................... 454/38 |
| 365,756 | A | * | 6/1887 | Elliott ....................... 104/188 |
| 2,387,708 | A | * | 10/1945 | Arnhym ..................... 454/116 |
| 3,347,147 | A | * | 10/1967 | Howard ..................... 454/38 |
| 3,952,638 | A | | 4/1976 | Felter et al. |
| 4,086,028 | A | | 4/1978 | Felter |
| 4,223,486 | A | | 9/1980 | Kelly |
| 4,379,972 | A | | 4/1983 | Sosa et al. |
| 4,557,081 | A | | 12/1985 | Kelly |
| 4,603,619 | A | * | 8/1986 | Amphoux .................... 454/33 |
| 4,888,930 | A | | 12/1989 | Kelly |
| 5,326,313 | A | | 7/1994 | Miniat |
| 6,302,778 | B1 | | 10/2001 | Andrews et al. |
| 6,582,291 | B1 | | 6/2003 | Clark |

* cited by examiner

*Primary Examiner*—Harold Joyce

(57) ABSTRACT

A surface mounted device includes a hollowed base body mounted on a building or vehicle exterior, and a hollowed raised body supported and secured on the base body with hollowed elongated members. A free space is formed between the base body and the raised body. An opening or openings are facilitated on, and near the center of, the lower surface of the raised body, to connect the free space with the internal space of the base body through the hollowed raised body and hollowed elongated support members. The base body and the raised body are configured in such a way that the free space between them is narrower at the center than along the perimeter. This forms an airflow path that is first contracting towards the center and then expanding afterwards for any approaching wind direction, providing a venturi mechanism. The device thus creates a low air pressure in the free space near the center and hence suction effect at said opening, and communicates the suction effect to any space that is connected to the internal space of the base body.

1 Claim, 4 Drawing Sheets

AERODYNAMIC SUCTION VENTILATOR

CROSS-REFERENCE TO RELATED APPLICATIONS

This application is entitled to the benefit of Provisional Patent Application Ser. No. 60/500,957, filed 2003 Sep. 08.

BACKGROUND

1. Field of Invention

This invention relates to an improved air exhaust system, which can be utilized in the field of building and vehicle ventilation, as well as in the field of roof construction for creating suction or negative pressure underneath a membrane or other roof materials against wind uplift.

2. Discussion of Prior Art

Roof components and materials are susceptible to uplift damage caused by strong winds. U.S. Pat. Nos. 4,223,486; 4,557,081 and 4,888,930 to T. L. Kelly, Waterbury, Conn. taught a method to equalize or balance the uplift on the upper surface of the membrane by channeling the negative pressure therein to underneath the membrane.

That method, while intended to tap the negative pressures that occur in the roof corner and edge areas, has the potential to actually feed positive pressure into underneath the membrane, enhancing the uplift force so as to worsen the situation. This is because of the fact that the wind flow on the roof is highly turbulent and complex, frequently deviating from the situation the Kelly equalizer system is designed for. Particularly in the roof corner and edge areas the airflow is dominated by strong, fluctuating and intermittent vortices, and pressures therein fluctuate significantly from negatives to positives as evidenced in wind tunnel and field test data. Strong down-wash flow also occurs frequently due to the effects of the edge/corner vortices or the influences of adjacent taller structures, which creates positive pressure, potentially on the parts of the roof where the Kelly system unit is installed. Although the Kelly method also includes a valve intended to "prevent" any positive pressures from entering into underneath the membrane, the air tightness of the contracted valve sleeves is hardly sufficient to block out the infiltration of positive pressures. Such additional mechanism also complicates the system, increases the probability or chances of component and system failure, and raises the cost of the system as well.

In the field of building and vehicle ventilation, a number of designs exist for aiding air exhaust or air relief, for example, U.S. Pat. Nos. 6,582,291 B2; 6,302,778 B1; 5,326,313; 4,379,972; 4,086,028 and 3,952,638 to various inventors. However, none provides a simple and effective method. Most of them involve complicated and expensive moving parts such as turbines, fans and associated bearings etc., which also increase the chances of mechanical failure.

SUMMARY OF THE INVENTION

The present invention provides a surface-mounted air exhaust device, or so-called suction ventilator, that is foolproof in ensuring negative pressure or suction at the exit under any external flow condition, which can be used for aiding air relief or ventilation in buildings, vehicles or trailers. It also can be channeled to the underside of roof membrane or other roof component against wind uplift. By disposing the ventilator's exit opening in a contracted free space between a base body and a raised body, a venturi suction effect is created at the opening that either sucks air from the ventilator housing for ventilation application or maintains suction inside the ventilator housing for wind-resistant roof construction.

The venturi suction effect generates a lower pressure at the exit opening than the ambient pressure in the external flow field over the roof or along a wall, termed negative pressure or suction. The stronger the flow speed, the lower the pressure at the exit opening, and the stronger the suction effect. This suction effect provides the ventilator the functionality that can be used for buildings to counter uplifts or other wind-induced outward forces by channeling the ventilator housing and thus the exit suction to the underside or backside of a building envelope component.

The low pressure generated at the exit opening is also generally significantly lower than the internal pressure inside a building, vehicle, or compartments therein, and other nominally enclosed objects or units. This effect lends the suction ventilator the functionality of aiding air exhaust, natural or forced, for the ventilation of spaces in buildings, vehicles or other nominally enclosed objects and units that are connected to the ventilator housing.

OBJECTS AND ADVANTAGES

Accordingly, several objects and advantages of the present invention are:

to provide a foolproof air exhaust ventilator that ensures negative pressure or suction at the exit under any external flow condition for improved air relief in buildings, vehicles, trailers or other such enclosed objects and units;

to provide a simple and reliable device that can be used to supply negative pressure or suction channeled to the underside or backside of a building envelope component, such as roof or wall surface components, to counter uplifts or outward forces on the building envelope under extreme wind conditions and thus minimize the chance of wind damage to the building envelope;

to provide a device that possesses such a desired flexibility as being suitable to be mounted on horizontal, vertical and sloping surfaces as situation requires;

to provide a device that is still among the most effective and efficient whereas it obviates any moving parts, which are expensive, and often represent the sources of mechanical failure and render the unit malfunctioned;

Further objects or advantages are to provide a device that is among the simplest, lightweight, rain infiltration proof, most inexpensive to manufacture and convenient to install. These and still further objects and advantages will become apparent from a consideration of the ensuing description and drawings.

BRIEF DESCRIPTION OF THE DRAWINGS

FIGS. 1, 2 and 3 schematically illustrate one of the preferred basic configurations according to the present invention, as being installed on a horizontal surface as an example. Wherein FIG. 1 is a side view of the device and FIG. 2 is its top view. FIG. 3 is a cross-sectional view taken along line 3—3 of FIG. 2.

FIGS. 6A, 6B and 6C schematically illustrate another configuration according to the present invention for a suction ventilator, which consists mainly of plane surfaces. Wherein FIG. 6A is a side view of the device and FIG. 6B is its top view. FIG. 6C is a cross-sectional view taken along line 6C—6C of FIG. 6B.

DESCRIPTION OF THE PREFERRED EMBODIMENTS

Figure 1:
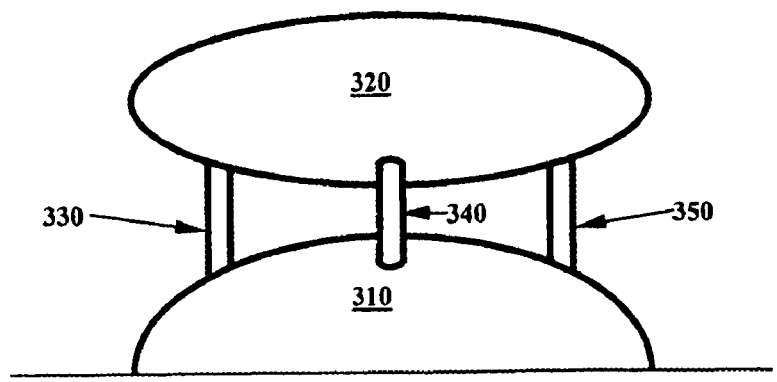
Figure 2:
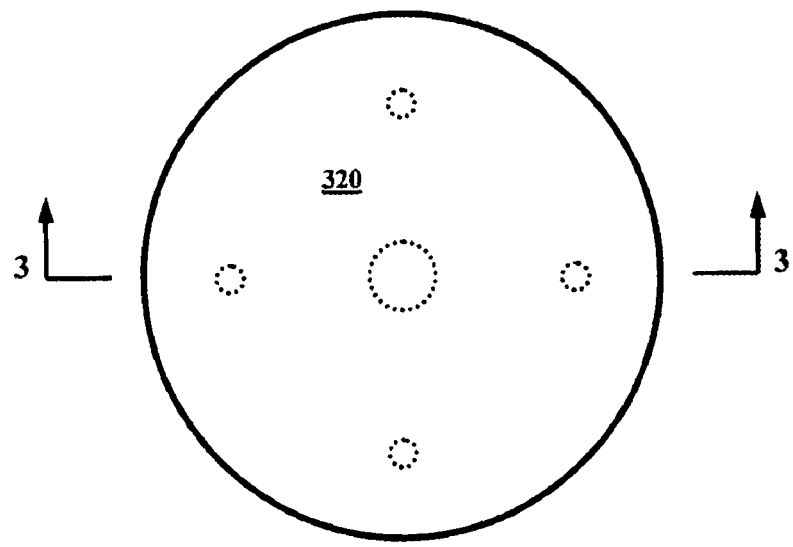
Figure 3:
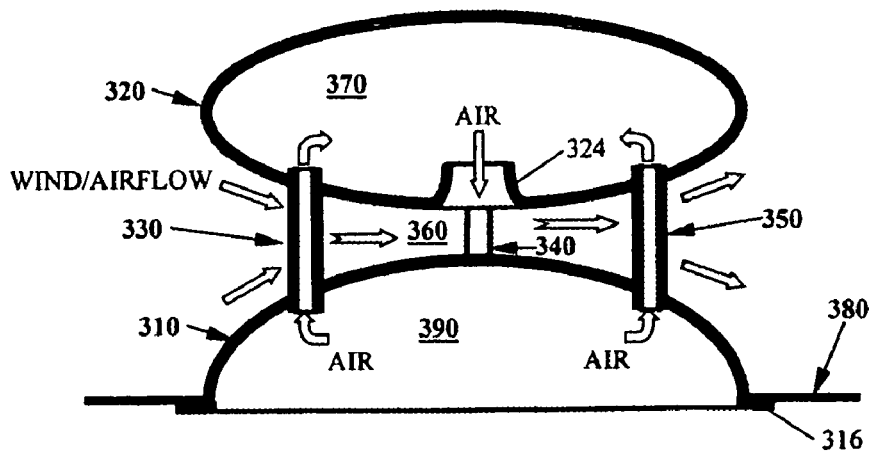

FIGS. 1 through 3 illustrate one of the preferred basic configurations of the present invention, as being mounted on a horizontal surface as an example. FIG. 1 is the side view of the aerodynamic suction ventilator and FIG. 2 is its top view, while FIG. 3 shows the 3—3 cross-sectional view. A hollow base body 310 of convex shape is attached and mounted onto a surface, with any appropriate means, while a hollow raised body 320 of oval shape is supported and secured to the base body with a plurality of elongated hollow members, for example, 330, 340 and 350 herein. The base body 310 and raised body 320 are so configured that the free space 360 formed between them is narrower near their center than along their outer perimeter, forming an airflow path that first contracts and then expands under any approaching wind direction. The number and size of the support members should be sufficient to support the raised body 320 but not be excessive to over-occupy the free space 360 formed between the base body 310 and the raised body 320. An opening 324 near the center of the underside of the raised body 320 communicates the free space 360 with the internal space 390 within the base body 310, through the hollow raised body 370 and support members 330, 340 and 350 etc. When external airflow passes the space 360, which may be caused by wind or by a moving vehicle, it accelerates while approaching the middle part of the space 360 so that the pressure therein becomes negative relative to the ambient pressure as governed by Bernoulli principle, called venturi effect. The higher the wind speed, the stronger the negative pressure will be. This negative pressure, or so-called suction, is being transmitted to the internal spaces 370 and 390 through the opening 324, and further to any other space that is connected to the internal space 390. For example, if the internal space 390 is channeled to spaces underneath a roof membrane 380 or other sealed roof covering, this negative pressure or suction will yield two desirable effects. First, it helps pull the membrane 380 or roof covering down during high winds. Second, it helps ventilate the spaces underneath the membrane or roof covering in regular wind conditions. This suction can also be channeled, with any appropriate means such as a conventional duct or conduit, to a specific space in a building, vehicle or trailer, for example, a bathroom or lavatory therein, for ventilation purposes, improving air flux. This is applicable in both natural or forced ventilation scenarios.

By having the middle opening 324 disposed on the underside of the raised body 320, this invention provides a better protection from rainwater infiltration for the interior of the ventilator and any interior space connected to it.

Figure 4:
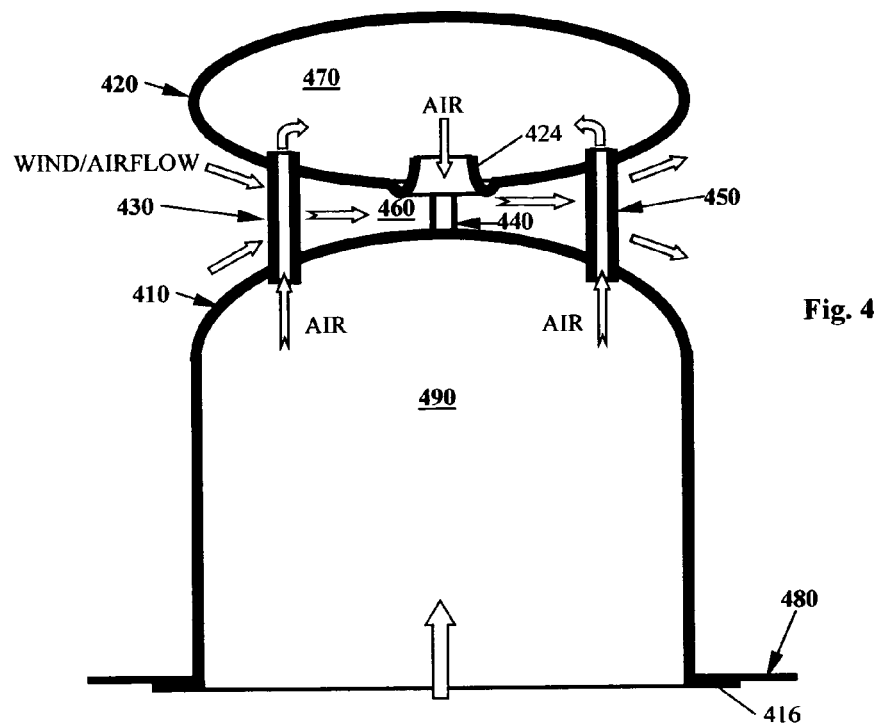
FIGS. 4 and 5 are examples of elevated suction ventilators.

The specific shapes shown in the previous figures for the base body, the raised body and other elements of the suction ventilator are merely used as examples to assist in illustrating the general conception. Variations are allowable for their shapes, such as modifying the ratio of height to width, or aspect ratio. Shapes with height greater than width can be used for either or both of the base body and the raised body. FIG. 4 shows an example where the height of the base body 410 is significantly greater than its width and the opening 424 is protruding downwardly from the raised body 420.

Figure 5:
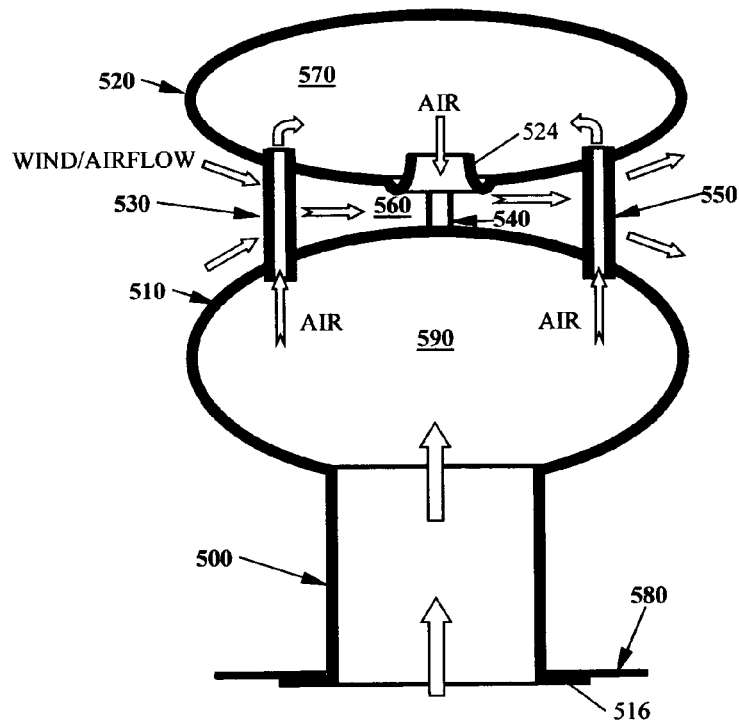
Figure 6A:
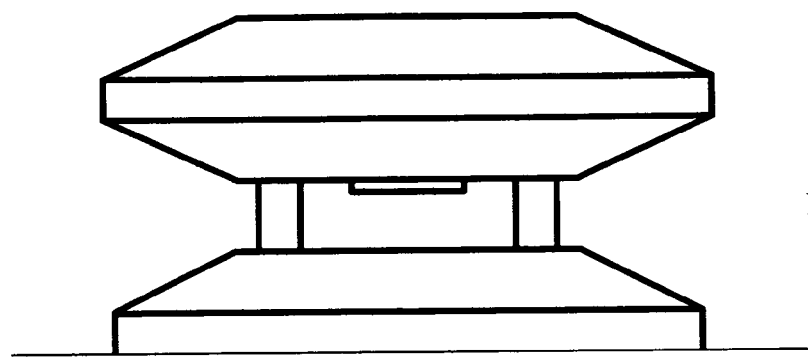
Figure 6B:
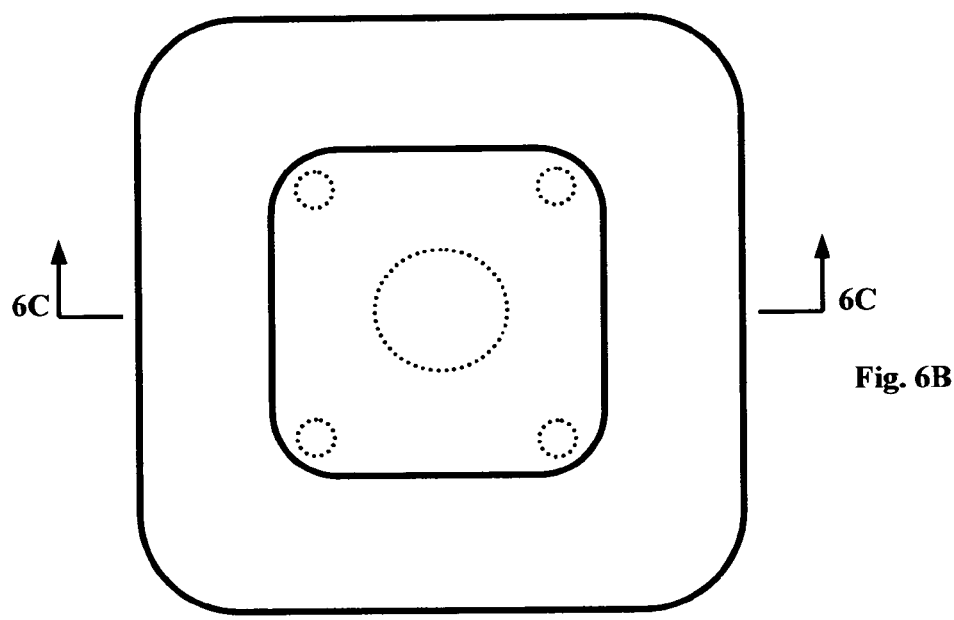
Figure 6C:
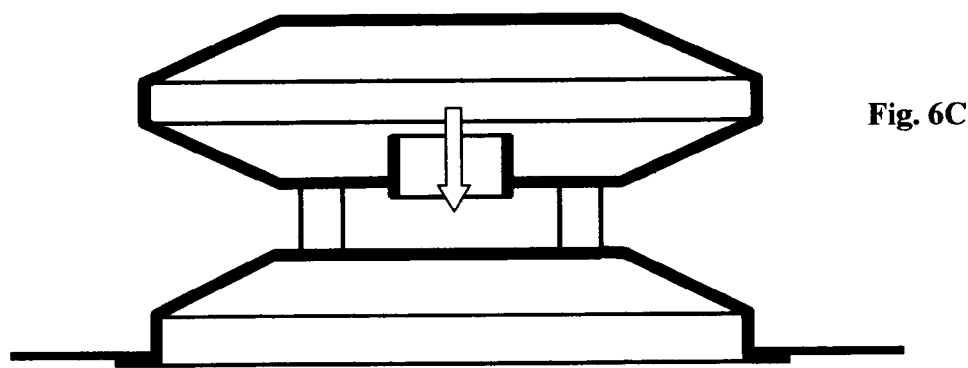
Figure 7:
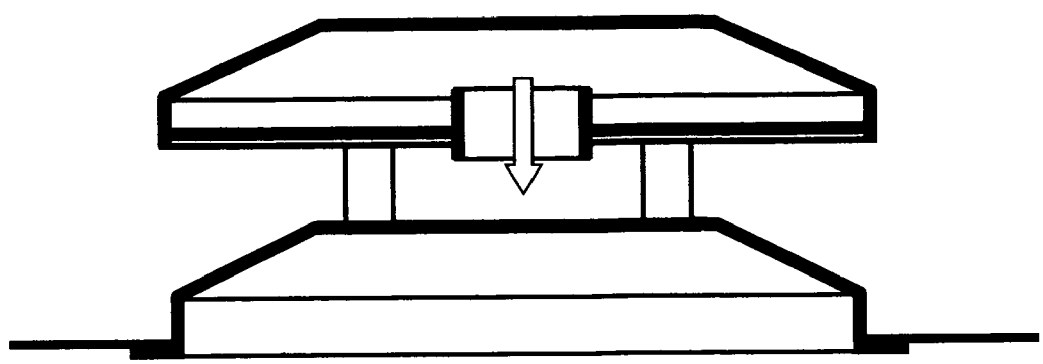
FIG. 7 illustrates further another embodiment of this invention that utilizes plane surfaces.

FIG. 5 shows further another example for which the base body 510 and thus the ventilator is elevated from the roof surface with a supporting member 500.

Configurations primarily comprising of plane surface can also be utilized. FIGS. 6A to 6C and FIG. 7 show respective examples of such alternative configurations.

Figure 8:
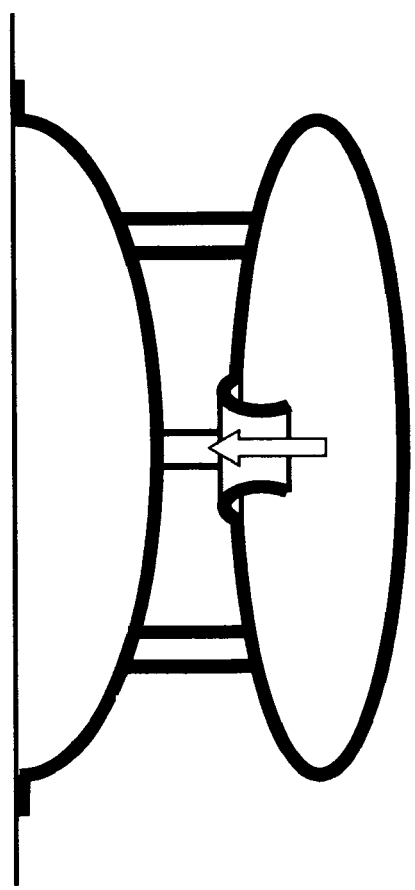
FIG. 8 shows an exemplary vertical surface-mounted suction ventilator.

An embodiment of this invention can also be used as a wall-mounted device on buildings, vehicles or other objects. FIG. 8 shows an example of such wall-mounted configurations.

Embodiments of this invention can further still be used on sloping surfaces. For applications on sloping surfaces, such embodiments as those illustrated in FIGS. 3 through 6 are preferred in that the configuration with the opening disposed on the raised body and facing downwards provides better protection from rainwater infiltration.

INSTALLATION AND OPERATION

In principle, the suction ventilator described herein is functional anywhere on the building or vehicle exterior where there are relative air movements, such as those caused by wind or by a moving vehicle. Nevertheless, there are optimal locations on the roof and on the wall where installed suction ventilators will function most effectively. Generally, these locations are near roof corners, edges and ridges, as well as wall edges and corners, where airflow velocity is normally the strongest. In particular, near the corners of a flat roof with no or low parapets, for example, roof locations along two rays that radiate from the corner and form an angle of about 15 degrees with either of the roof edges are the ideal locations for optimal suction ventilator effectiveness.

Suction ventilators described in this application are passive, flow-activated devices. Once installed properly, they stay operating and functioning as wind blows, and require no active intervention.

CONCLUSION, RAMIFICATIONS, AND SCOPE

It is apparent that suction ventilators of this invention provide aerodynamically advantageous, energy conserving air exhaust and suction generation system, and is still among the simplest, most inexpensive to manufacture and convenient to install.

Although the description above contains many specifications, these should not be construed as limiting the scope of the invention but as merely providing illustrations of some of the presently preferred embodiments of this invention. Various changes, modifications, variations can be made therein without departing from the spirit of the invention. For example, the outer perimeter edge of the raised body can be a sharp edge, instead of being a blunt edge as shown for all the above given examples. The suction ventilators can be made of any reasonably durable material with any appropriate means of fabrication as long as a configuration according to the spirit of this invention is accomplished to support the described working mechanism and to provide the associated functionality. Various surface portions of a suction ventilator may also bear such surface details as corrugation or steps of adequate sizes, as opposed to perfectly smooth surfaces. Any appropriate conventional or new surface mount method can be used to secure a suction ventilator to a horizontal, vertical or sloping surface without departing from the spirit of this invention. Thus the scope of the invention should be determined by the appended claims and their legal equivalents, rather than by the examples given.

I claim:

1. A surface mounted device comprising:

a hollowed base body being mounted on building or vehicle exterior;

a hollowed raised body being supported and secured on said base body with a plurality of hollowed elongated members;

a free space being formed between said base body and said raised body;

an opening or a plurality of openings being facilitated on, and near the center of, the lower surface of said raised body, and being channeled to the internal space of said base body through the internal spaces of said raised body and elongated members;

and means of mounting and securing said base body to building or vehicle exterior;

wherein said free space being generally narrower at the center than along the perimeter, forming a first contracting and then expanding airflow path for any approaching wind direction, whereby to create a low pressure or a suction effect at said opening(s) and communicate said suction effect to any space connected to said internal space of said base body.

* * * * *